June 4, 1929. L. HALK 1,715,914
MANICURE APPLICATOR
Filed April 7, 1928
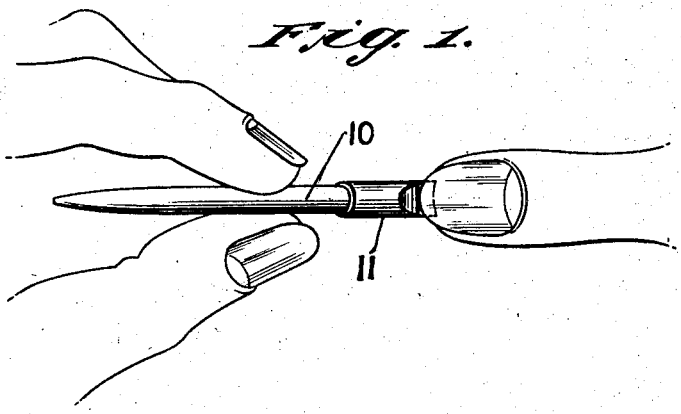
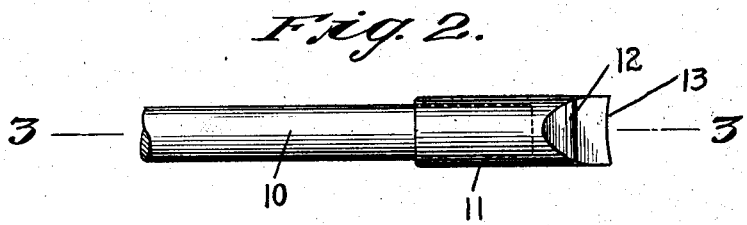
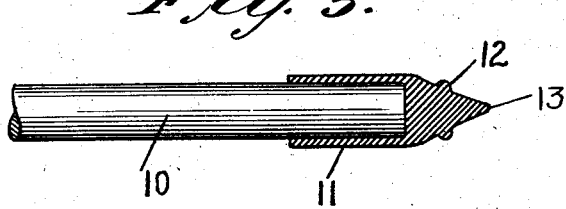
Louis Halk
INVENTOR
BY Mock & Blum
ATTORNEYS Patented June 4, 1929.

1,715,914

UNITED STATES PATENT OFFICE.

LOUIS HALK, OF HACKENSACK, NEW JERSEY, ASSIGNOR TO NORTHAM WARREN CORPORATION, OF NEW YORK, N. Y., A CORPORATION OF NEW YORK.

MANICURE APPLICATOR.

Application filed April 7, 1928. Serial No. 268,153.

This invention relates to improvements in manicuring devices and especially to devices for applying liquids, semi-liquids or paste substances either to the surface of the nail or under the nail surface.

A particular object of the invention is the provision of a new form of applicator which will enable a small amount of a material to be applied to the under-surface of the nail with a minimum amount of waste.

Further objects of the invention will be apparent from the drawings in which—

Fig. 1 is a perspective view showing the manner in which my improved applicator is used.

Fig. 2 is an enlarged side view of the applicator.

Fig. 3 is a section along the line 3—3 of Fig. 2.

The applicator comprises a handle 10 made of orange wood or other suitable wood or material, on the end of which handle is put the spreader 11. The end of the handle may be pointed or otherwise fashioned so as to serve for the ordinary uses of an orange stick, but this is no part of my invention.

The spreader 11 is made of rubber or similar elastic material, the base being hollow so as to fit over the handle 10. The end of the spreader 11 is triangular in cross-section as will be apparent from an inspection of Fig. 3 of the drawing and has a rib 12 which is important in retaining a film of liquid or semi-liquid or paste when the spreader is used.

The manner of operation of the applicator is as follows:

The end is dipped into the material which is to be applied to the nail and the surplus material can be shaken off. The necessary quantity of material will adhere by capillarity or adhesion between the point of the spreader 13 and the rib 12, so that when the spreader is applied either under the nail as is shown in Fig. 1 or over the cuticle, there will always be an effective but minimum quantity of material present so that it is used only where it is wanted and does not run over the skin where necessarily it is of no use for manicuring purposes. It is also evident that a spreader of this kind will also be useful for applying liquid or paste nail polishes on the nail itself. In this particular embodiment, I have shown an applicator made of two parts, but it is apparent that this applicator may be made of one piece and also that the shape of the end may be varied without departing from the spirit of my invention.

Having fully described my invention, what I claim is:

1. An applicator for applying a liquid or paste substance to the nail comprising a handle having a tip with its edge at right angles to said handle, and a rib adjacent to said tip and parallel to said tip.

2. An applicator for applying a liquid or paste substance to the nail, comprising a handle and a tip of resilient material, and a rib adjacent said tip and parallel thereto.

3. An applicator for applying a liquid or paste substance to the nail, comprising a handle and a tip or resilient material fitting over the end of said handle and having a rib adjacent the apex of said tip.

In testimony whereof I affix my signature.

LOUIS HALK.